United States Patent [19]

Meltz et al.

[11] Patent Number: 5,042,897
[45] Date of Patent: Aug. 27, 1991

[54] OPTICAL WAVEGUIDE EMBEDDED LIGHT REDIRECTING BRAGG GRATING ARRANGEMENT

[75] Inventors: Gerald Meltz, Avon; William H. Glenn, Vernon, both of Conn.

[73] Assignee: United Technologies Corporation, Hartford, Conn.

[21] Appl. No.: 456,450

[22] Filed: Dec. 26, 1989

[51] Int. Cl.$^5$ .............................................. G02B 6/34
[52] U.S. Cl. ........................................................ 385/37
[58] Field of Search ....................................... 350/96.19

[56] References Cited

U.S. PATENT DOCUMENTS

| 4,725,110 | 2/1988 | Glenn et al. | 350/96.19 |
| 4,807,950 | 2/1989 | Glenn et al. | 350/96.19 |
| 4,867,522 | 9/1989 | Cassidy | 350/96.19 |
| 4,946,245 | 8/1990 | Chamberlin et al. | 350/96.19 |

Primary Examiner—William L. Sikes
Assistant Examiner—Robert E. Wise
Attorney, Agent, or Firm—Peter R. Ruzek

[57] ABSTRACT

An optical waveguide light tapping arrangement includes an optical waveguide having solid portions that guide light in a first path along a longitudinal axis, with at least one grating region being embedded in the solid portion at a location remote from its end portions. The grating region includes a multitude of grating elements extending with a substantially equal longitudinal spacing at an oblique angle relative to the longitudinal axis to redirect light reaching the grating elements between the first path and at least one second path extending externally of the waveguide at an angle relative to the longitudinal axis that depends on the oblique angle. When light is directed in one of the first and second paths toward the grating region, it is redirected by the grating elements into the respectively other of the second and first paths with attendant in-phase combination in the other path of light having a wavelength within a narrow range around a central wavelength that is in a predetermined relationship to the spacing of the grating elements. The light propagating in the other path can then be captured. The grating elements are formed in the core by exposing the core to an interference pattern of two ultraviolet radiation beams that are symmetrical with respect to a plane extending at the oblique angle relative to the core axis.

9 Claims, 1 Drawing Sheet

OPTICAL WAVEGUIDE EMBEDDED LIGHT REDIRECTING BRAGG GRATING ARRANGEMENT

TECHNICAL FIELD

The present invention relates to optical waveguides in general, and more particularly to optical waveguides, especially fibers, that are provided with embedded light redirecting Bragg gratings, to optical systems utilizing such optical waveguides, and to a method of producing such optical waveguides.

BACKGROUND ART

There are already known various constructions of optical waveguides, including optical fibers are provided with embedded gratings that are being used either for inserting light into or for removing light from the respective optical waveguide at an intermediate location or at different intermediate locations of the waveguide. So, for instance, the U.S. Pat. No. 4,749,248 to Aberson, Jr. et al, issued on June 7, 1988, discloses a device for tapping radiation from, or injecting radiation into, a single mode optical fiber. This patent discloses that it is possible to convert a guided mode in an optical fiber into a tunnelling leaky mode or vice versa by forming a grating of appropriate periodicity at least in the core of the optical fiber, and either to remove the guided mode from the fiber core into the cladding by converting it into the leaky mode, and ultimately from the fiber altogether, or to insert light of an appropriate wavelength into the core to form a guided mode therein by directing light of a proper wavelength from the exterior of the fiber toward the grating to propagate in the fiber cladding and to be converted by the grating into the guided mode in the fiber core. It is disclosed in this patent that the grating may be formed mechanically or by exploiting the photoelastic or photorefractive effect; in either case, the grating is formed in such a manner that fiber core regions of identical optical properties are situated in planes oriented normal to the longitudinal axis of the optical fiber.

While this approach may achieve satisfactory results for some applications, it has an important disadvantage in that it results in very high losses of optical power coupled out of or into the optical fiber. This is at least partially attributable to the fact that, inasmuch as the grating is imposed normal to the longitudinal axis of the core, the conversion of the guided mode into the leaky mode or vice versa takes place with uniform distribution all around the fiber axis, so that a predominant proportion of the leaky mode is not captured by the sensing arrangement when this approach is being used to tap light out of the fiber, or bypasses the fiber core when this approach is being used to launch light into the core via the cladding mode and its conversion into the guided core mode at the grating.

It is also already known, for instance from the commonly owned U. S. Pat. No. 4,725,110, issued on Feb. 16, 1988, to impress periodic gratings into the optical fiber core by exposing the core through the cladding to the interference pattern of two coherent ultraviolet light beams that are directed against the optical fiber at two angles relative to the fiber axis that complement each other to 180°. This results in a situation where the grating is oriented normal to the fiber axis so that it reflects, of the light launched into the fiber core for guided propagation therein in a propagation direction, only that having a wavelength within a very narrow range, back along the fiber axis opposite to the original propagation direction so that such reflected light is guided in the core to the point at which the original light had been launched into the fiber core. On the other hand, this grating is transparent to light at wavelengths outside the aforementioned narrow band so that it does not affect the further propagation of such other light. It may be seen that this approach has its limitations as well in that it is not suited for removing meaningful amounts of light from or launching them into the fiber at any other location than the respective fiber ends.

Accordingly, it is a general object of the present invention to avoid the disadvantages of the prior art.

More particular, it is an object of the present invention to provide an optical waveguide with an embedded light redirecting arrangement which does not possess the disadvantages of the known arrangements of this kind.

Still another object of the present invention is to develop the light redirecting arrangements of the type here under consideration in such a manner as to obtain highly efficient coupling of light at a selected wavelength within a limited range between the optical waveguide core and a spatially limited path extending externally of the core.

It is yet another object of the present invention to devise an optical system utilizing the embedded grating optical waveguide of the above type, which system is instrumental in providing for the efficient coupling of light into and out of the optical waveguide.

Yet another object of the present invention is to design the system of the above type in such a manner as to be relatively simple in construction, inexpensive to manufacture, easy to use, and yet reliable in operation.

A concomitant object of the present invention is to develop a method of forming the embedded tap in the optical waveguide core, which method is highly efficient and reliable.

DISCLOSURE OF THE INVENTION

In keeping with these objects and others which will become apparent hereafter, one feature of the present invention is embodied in an optical waveguide light tapping arrangement which includes an optical waveguide having two spaced end portions, and including at least a waveguiding portion of a solid material capable of guiding light between the end portion in a first path extending along a predetermined axis. According to the invention, at least one grating region is embedded in the waveguiding portion at a location remote from the end portions, and has a multitude of grating elements extending with a substantially equal spacing as considered in the direction of the axis at an oblique angle relative to the axis to redirect light reaching the grating elements between the first path and at least one second path extending externally of the waveguide at an angle relative to the axis that depends on the oblique angle. There is further provided first optical means for directing light into one of the first and second paths and toward the grating region for redirection by the grating elements into the respectively other of the second and first paths with attendant in-phase combination in the other path of light having a wavelength within a narrow range around a central wavelength that is in a predetermined relationship to the spacing of the grating elements, and second optical means for capturing the light propagating in the other path.

Another aspect of the present invention is a method of producing the grating region, which involves the exposure of the waveguiding portion to the interference pattern of two coherent ultraviolet radiation beams, where the angles of these beams with respect to the longitudinal axis of the waveguiding portion are selected in such a manner that the interference pattern fringes (e.g. intensity peaks) extend through the waveguiding portion at the aforementioned oblique angle and induce permanent variations in the refractive index of the waveguiding portion in dependence on the intensity of the fringes, thus forming the aforementioned grating elements. The present invention is also directed to a novel article of manufacture, that is, to an optical waveguide, especially an optical fiber, which is provided with at least one of the above-discussed redirecting grating regions, it being particularly advantageous if the grating region is produced by resorting to the above-discussed method of the present invention.

BRIEF DESCRIPTION OF THE DRAWING

The present invention will be described in more detail below with reference to the accompanying drawing in which.

BEST MODE FOR CARRYING OUT THE INVENTION

Figure 1:
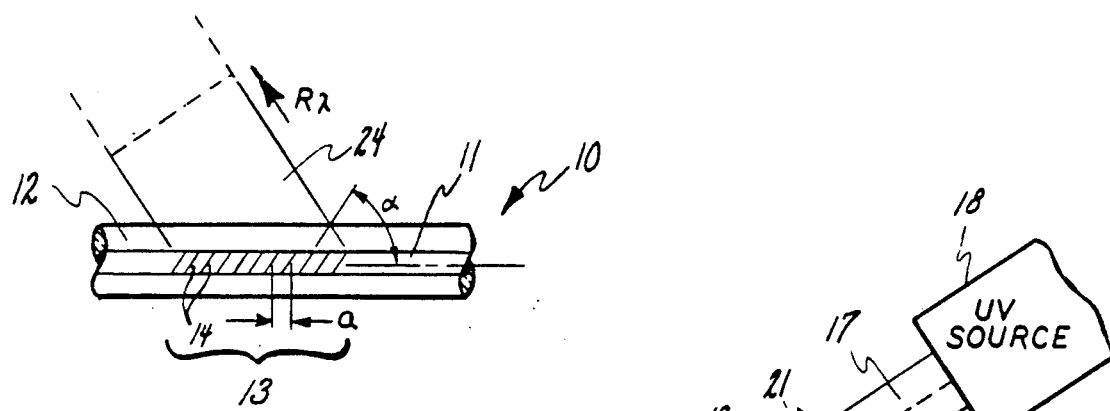
FIG. 1 is a considerably enlarged axial sectional view of an optical fiber provided with an embedded grating region in accordance with the present invention for use in redirecting light into or out of the fiber core.

Referring now to the drawing in detail, and first to FIG. 1 thereof, it may be seen that the reference numeral 10 has been used therein to identify an optical waveguide. The waveguide 10 is shown to be configured as an optical fiber of which only a relatively short longitudinal portion is depicted and which includes a fiber core 11 and a fiber cladding 12 surrounding the fiber core 11. The fiber core 11 incorporates a grating region 13 that includes a multitude of grating elements 14 each extending at substantially the same oblique angle $\alpha$ with respect to the longitudinal axis of the core 11. The grating elements 14 are spaced the same distance a from one another as considered in the longitudinal direction of the optical fiber 10.

A currently preferred method of forming the grating elements 14 in the grating region 13 of the core 11 will now be described with reference to FIG. 2 of the drawing. The method of the present invention is based on but constitutes a modification of the method disclosed in the aforementioned U. S. Pat. No. 4,725,110 the disclosure of which is incorporated herein by reference to the extent needed for understanding the background on which the present invention is based and for pointing out the improvement and advantages brought about by the present invention. The core 11 of the waveguide or fiber 10, which is to be provided with a series of the embedded inclined Bragg redirection grating elements 14, is preferably of a germanium-doped silica or similar glass that is capable of having the grating elements 14 written, impressed or otherwise applied or embedded therein. According to one aspect of the invention, this inclined grating element embedding is achieved by application of an interference pattern of two ultraviolet radiation beams. These thus produced periodic grating elements 14 then constitute refractive index perturbations that are permanently induced in the core 11 by exposure to ultraviolet radiation.

The grating region 13 is formed, using a first order absorption process, by transversely irradiating the fiber 10 with light in the ultraviolet absorption band of the core material. As shown in a somewhat simplified manner in FIG. 2, the grating region 13 characterized by the specific selected grating element spacing a can be formed by illuminating the core 11 from the side, preferably through the cladding 12 and without affecting the latter, with two coherent beams 15 and 16 incident on the optical fiber 10 at incidence angles $\theta_1$ and $\theta_2$ with respect to a reference plane. The angles $\theta_1$ and $\theta_2$ are such that intensity peaks of an interference pattern resulting from interference of the coherent incident beams 15 and 16 extend at the aforementioned angle $\alpha$ into and through the optical fiber 10. The period a and the angle $\alpha$ are selected by appropriately varying the incidence angles $\theta_1$ and $\theta_2$ for the selected wavelength of the ultraviolet radiation. Such exposure induces a permanent refractive index changes in the grating region 13, in effect creating a phase grating effective for redirecting light reaching the same. The fiber axis includes an angle of $90° - \alpha$ with an intersection line of the reference plane with that of the drawing. This angle is shown in FIG. 2 to be situated in the drawing plane; however, the same effect would be achieved if, as also contemplated, this angle were located in the reference plane or, for that matter, generally speaking, in any other plane including the aforementioned intersection line.

Figure 2:
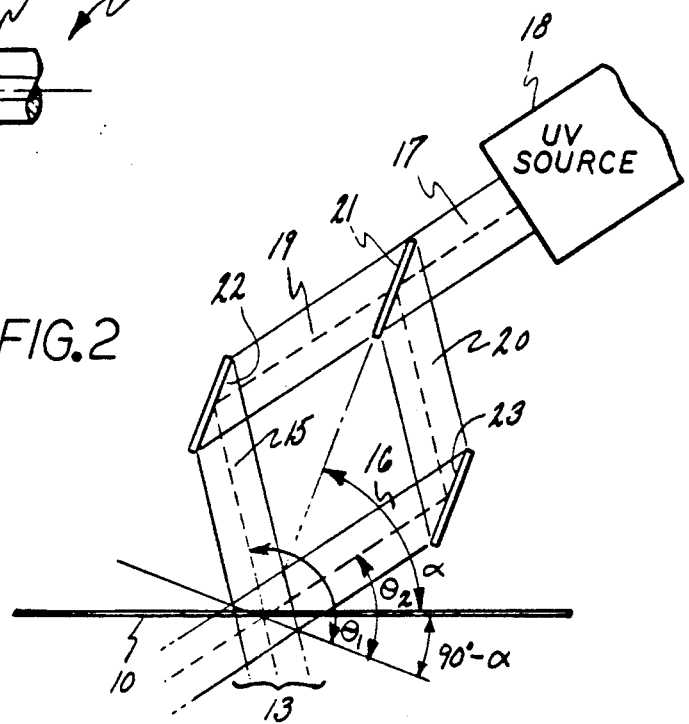
FIG. 2 is a side elevational view of an optical arrangement for forming the embedded grating elements in the grating region depicted in FIG. 1 in the core of the optical fiber.

FIG. 2 also illustrates further details of the arrangement that can be used in accordance with the present invention for the formation of the periodic perturbations or grating elements 14 in the grating region 13 of the fiber core 11 in response to exposure of the core 11 to the obliquely transverse ultraviolet radiation. The grating spacing a is determined by the incidence angles $\theta_1$ and $\theta_2$ of the incident interfering beams 15 and 16, but it also depends on the wavelength of the ultraviolet radiation. As can be seen in FIG. 2, the angles of incidence $\theta_1$ and $\theta_2$ of the beams 15 and 16 are complements of each other with respect to the aforementioned reference plane (i.e. their sum equals 180 degrees) or, viewed differently, the beams 15 and 16 propagate symmetrically with respect to a normal to the reference plane, so that the interference pattern intensity peaks extend through the optical fiber 10 and, consequently, the grating elements 14 are inscribed into the core 11, in directions normal to such reference plane and thus at the aforementioned angle $\alpha$ with respect to the optical fiber core axis.

The pair of the complementary incident beams 15 and 16 can be derived from a single beam 17 issued by an ultraviolet radiation source 18 and partially passing through (as a beam component 19) and partially reflected by (as a reflected beam component 20) an only diagrammatically indicated beam splitter 21. The passing and reflected beam components 19 and 20 are further reflected by spaced parallel reflectors 22 and 23 to constitute the incident beams 15 and 16 following such reflections. The angles of incidence $\theta_1$ and $\theta_2$ of the incident beams 15 and 16 upon the core 11 can be controlled by either increasing or decreasing the separation between the reflectors 22 and 23 and by correspondingly varying the angle of incidence of the beam 17 on the beam splitter 21.

When the grating elements 14 are produced in this manner, consecutive ones of the grating elements 14 are present at the same periodic spacings a throughout the grating region 13 but are absent from regions of the fiber core 11 that are longitudinally consecutive with the respective ends of the grating region 14. This, of course, means that the light that is guided in, or to be launched into, the core 11 is redirected out of or into the optical fiber 10, respectively, solely at the grating region 13 and not elsewhere in the optical fiber 10, thus avoiding unnecessary and highly undesirable optical power losses. While only a quite small portion of the light propagating through the fiber core 11 or being launched into the core 11 is redirected at each of the grating elements 14 as a result of the refractive index changes attributable to the presence of the grating elements 14, subsequently to either leave the optical fiber 10 through its cladding 12 or to be launched into the core 11 for guided longitudinal propagation therein, respectively, the cumulative effect of the grating elements 14 is the redirection of a significant proportion of the light the wavelength of which is in a very narrow range around the center wavelength $\lambda$ that is in a predetermined ratio to the periodicity a of the grating elements 14 in the form of a redirected beam 24, as indicated by an arrow R $\lambda$ in FIG. 1.

Furthermore, the light within the narrow range that is thus redirected at any one of the grating elements 14 out of the optical fiber 10 is in such a phase relationship with respect to the light redirected at any other of the grating elements 14 that the thus formed cumulative redirected light beam 24 has a substantially planar wavefront indicated in FIG. 1 by a broken line 25, so that substantially none of the thus escaping redirected light is lost to destructive interference or diffraction. Moreover, the thus escaping redirected light beam 24 propagates outside the optical fiber 10 along a single direction determined by the aforementioned oblique angle $\alpha$, albeit with some fanning out in the circumferential direction, rather than all around the optical fiber 10; this facilitates the capture of the thus escaping light and increases the proportion of such light that is actually captured.

By the same token, when coherent light is being launched into the optical fiber core 11, it is sufficient to direct all of the power of such light all over the grating region 13 along a single direction substantially coincident with the path of the beam 24 and including the requisite angle $\alpha$ with the longitudinal axis of the core 11, rather than having to distribute such power all around the optical fiber 10 and, to the extent that such power is carried by light having a wavelength within the aforementioned narrow range around the center wavelength $\lambda$, a meaningful proportion of such directed light power will be redirected into the core 11 for guided longitudinal propagation therein even though only a small portion of such light is redirected at each of the grating elements 14. This effect is attributable to the constructive interference between the partial light amounts which have been redirected at the respective grating elements 14 with the partial light amounts redirected at the longitudinally consecutive ones of the grating elements 14.

It will be appreciated that the constructive interference is not limited to a single value of the central wavelength $\lambda$; however, the angle $\alpha$ of the path of the beam 24 that results in the constructive interference is peculiar to the respective central wavelength $\lambda$.

Figure 3:
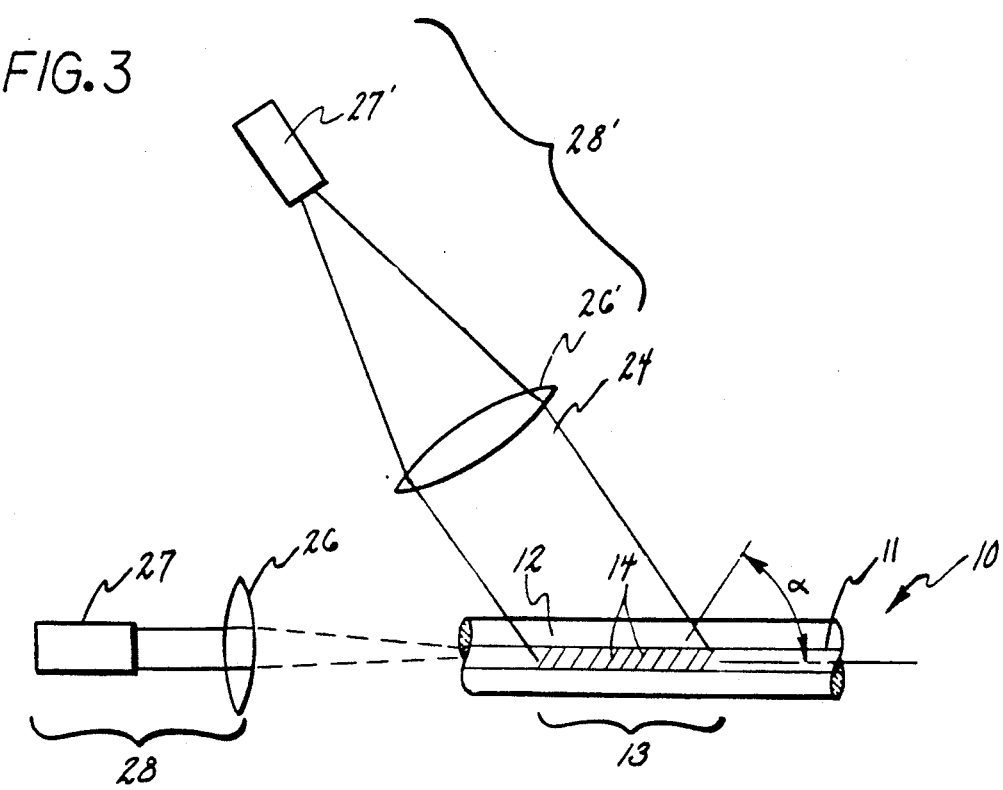
FIG. 3 is a view similar to that of FIG. 1 but further showing an arrangement for redirecting light in a predetermined wavelength range into or out of the optical fiber core via the grating region.

One currently contemplated way of achieving the capture of light launched through a lens 26 into the optical fiber core 11 by an issuing optical device 27 and emerging from the optical fiber 10 is illustrated in FIG. 3 of the drawing. In this case, the optical device 27 and the lens 26 constitute launching optics 28. It may be seen that the substantially collimated light beam 24 redirected by the embedded grating region 13 of the core 11 and escaping from the optical fiber 10 as a result of the presence of the grating elements 14 in the fiber core 11 is focused by a lens 26' onto a receiving optical device 27' that, together with the lens 26', constitutes receiving optics 28'. Then, the optical device is constructed to handle the escaping light in any appropriate or desired way; so, for instance, the receiving optical device 27' may be a photodetector of any known construction, in which case it converts the escaping light into some kind of, for instance electrical, signal that may then be further processed in any desired manner to obtain a final output. However, the receiving optical device 27' may be constituted by another optical fiber or other optical waveguide into which the escaping radiation is launched for further propagation therein to a location remote from the point of entry.

On the other hand, when the optics 28' depicted in FIG. 3 of the drawing is to be used for launching light into the optical fiber 10, then the optical device 27' may be constituted by another optical fiber that guides the light to be launched into the optical fiber 10 and is directed at the proper angle onto the grating region 13 of the optical fiber, a light emitting diode, a laser or the like. Under these circumstances, the optics 28 will be constructed as receiving optics of the kind and operating in a manner akin to those described above in conjunction with the optics 28' when constructed and operating as receiving optics. Depending on the properties of the light beam emerging either from the fiber 10 or from the optical device 27' (or 27) during the use of the optical fiber 10 for redirecting light out of or into the fiber 10 under the circumstances described above, and the type of the device 27' (or 27) and its distance from the optical fiber 10, the lens 26' (or 26) may be omitted or replaced by a mirror or an optical train containing appropriately shaped and positioned lens and/or mirror components.

The effect of this wavelength selective, unidirectional redirection is not only the removal of at least a significant amount of the light of the selected narrow wavelength band around $\lambda$ from the spectrum allowed to propagate through the core 11 beyond the grating region 13 when the latter is being used for tapping light out of the fiber core 11, or insertion of such light into the core 11 when the grating region 13 serves to launch light into the fiber 10, but also, an possibly more importantly, an easy capture of the tapped-out redirected light in the narrow wavelength band around $\lambda$ after its escape from the fiber 10 at the grating region location that may be situated a considerable distance from either one of the ends of the fiber 10, or easy insertion of such light into the fiber core 11 at such remote location. Thus, the grating region 13 including the inclined grating elements 14 of the present invention constitutes a wavelength selective tap in the optical fiber 10.

The optical fiber 10 described above may be used for various purposes and in various applications. So, for instance, when the optical fiber 10 that is provided with the embedded inclined grating region 13 in its core 11 is a multimode fiber, then the angles at which at least some of the different modes of light tapped out by the grating region 13 emerge from the optical fiber 10 at angles relative to the longitudinal axis of the fiber 10 that are different from one another, owing to the fact that such different modes encounter the grating elements 14 of the grating region 13 under different conditions and hence are differently affected thereby. This phenomenon may be used for effectively separating such different modes after they have been tapped out of the multimode optical fiber 10. Similarly, when using the grating region 13 for launching light into the core 11 of the optical fiber 10, it is possible to cause the thus launched light to preferentially or exclusively propagate in the optical fiber core 11 in one selected mode even when the fiber 10 is a multimode fiber, by appropriately selecting the angle of incidence of the light directed against the grating region 13 by the launching optical device 27' and/or the lens 26' or a similar launching optical arrangement 28'.

Moreover, the optical fiber 10, whether single mode or multimode, may be provided with more than the single grating region 13 described above. So, for instance, the periodicity a (and/or the angle $\alpha$) of each of such grating regions 13 may be different so that the wavelength $\lambda$ of the light redirected at each of such grating regions 13 out of or into the optical fiber core 11 (and/or the angle of propagation of such light outside the optical fiber 10) is correspondingly different. Also, if the optical fiber 10 is of the polarization preserving type (with the core 11 having, say, an elliptical cross section), each of the orthogonal polarizations can be tapped out of or into the core 11 separately if the angles $\alpha$ of such grating regions 13 are situated in planes respectively coinciding with the polarization planes. In this case, the respective emerging redirected (or directed) beams 24 are angularly shifted by 90° about the optical fiber axis relative to one another. In any event, inasmuch as each of the grating regions 13 affects only light within the aforementioned narrow wavelength range (or of one polarization) that is different from that of the other grating region or regions 13 while being substantially transparent to light of any other wavelength (or polarization), the grating regions 13 need not be longitudinally spaced from one another; rather, they may partially overlap one another or even be coextensive with each other.

While the present invention has been illustrated and described as embodied in a particular construction of an optical waveguide and associated equipment, it will be appreciated that the present invention is not limited to this particular example; rather, the scope of protection of the present invention is to be determined solely from the attached claims.

We claim:

1. An optical waveguide light redirecting arrangement comprising:

an optical waveguide having two spaced end portions, and including at least a waveguiding portion of a solid glass material capable of guiding light between said end portions in a first path extending along a predetermined axis;

at least one grating region permanently embedded in said waveguide portion at a location remote from said end portions and having a multitude of grating elements extending with a substantially equal spacing as considered in the direction of said axis at an oblique angle relative to said axis to redirect light reaching said grating elements between said first path and at least one second path extending externally of said waveguide at an angle relative to said axis that depends on said oblique angle;

first optical means for directing coherent light into one of said first and second paths and toward said grating region for redirection by said grating elements into the respectively other of said second and first paths with attendant in-phase combination in said other path of light having a wavelength within a narrow range around a central wavelength that is in a predetermined relationship to the spacing of said grating elements; and second optical means for capturing the light propagating in said other path.

2. The arrangement as defined in claim 1, and further comprising at least one additional grating region in said waveguiding portion that is similar to one said grating region but has at least one of said oblique angle and said spacing between said grating elements thereof different from that of said one grating region for redirecting light of different properties than that affected by said one grating region between said first path and an additional second path; and additional optical means including at least one of said first and second optical means in alignment with said additional second path.

3. The arrangement as defined in claim 2, wherein said additional grating region is at least partially coextensive with said one grating region.

4. The arrangement as defined in claim 2, wherein said optical waveguide is a polarization preserving optical fiber including a glass core constituting said waveguide portion; and wherein said grating regions are oriented each to redirect light having a different one of said polarizations between said first path and a different one of said second paths and to be substantially transparent to light having the respectively other of the polarizations.

5. An embedded light redirecting arrangement optical waveguide comprising:

an elongated waveguiding portion of a solid glass material having two longitudinally spaced end portions and capable of guiding light between said end portions in a first path extending along a predetermined axis; and at least one grating region permanently embedded in said waveguiding portion at a location remote from said end portions and having a multitude of grating elements extending with a substantially equal spacing as considered in the direction of said axis at an oblique angle relative to said axis to redirect light reaching said grating elements between said first path and at least one second path extending externally of said waveguide at an angle relative to said axis that depends on said oblique angle with attendant in-phase combination of that light directed in one of said paths against said grating region which has a wavelength within a narrow range around a central wavelength that is in a predetermined relationship to the spacing of said grating elements, in the other of said paths following redirection from said grating elements.

6. The optical waveguide as defined in claim 5, and further comprising at least one additional grating region in said waveguiding portion that is similar to one said grating region but has at least one of said oblique angle and said spacing between said grating elements thereof different from that of said one grating region for redirecting light of different properties than that affected by said one grating region between said first path and an additional second path.

7. The optical waveguide as defined in claim 6, wherein said additional grating region is at least partially coextensive with said one grating region.

8. The optical waveguide as defined in claim 6 configured as a polarization preserving optical fiber including a glass core constituting the waveguide portion, wherein said grating regions are oriented each to redirect light having a different one of said polarizations between said first path and a different one of said second paths and to be substantially transparent to the light having respectively other of the polarizations.

9. A method of forming an embedded permanent optical light redirecting grating in a selected grating region of an elongated solid glass waveguide portion of an optical waveguide, comprising the steps of:

forming two mutually coherent beams of coherent ultraviolet radiation; and directing the two beams transversely on the solid glass waveguide portion at respective angles of incidence selected for the beams to be symmetrical relative to a plane extending at an oblique angle relative to a longitudinal axis of the solid glass waveguide portion for the two beams to coherently interfere with one another with attendant generation of an interference pattern having intensity peaks that extend at said oblique angle into and through said grating region and form therein a multitude of permanently embedded grating elements that are disposed at the oblique angle and at a substantially equal longitudinal spacing throughout the grating region and are capable of redirecting light reaching them between a first path extending longitudinally through the solid portion and at least one second path extending externally of the waveguide at an angle relative to the longitudinal axis that depends on the oblique angle with attendant in-phase combination of that light directed in one of the paths against the grating region which has a wavelength within a narrow range around a central wavelength that is in a predetermined relationship to the spacing of the grating elements, in the other of said paths following redirection from the grating elements.

\* \* \* \* \*